May 25, 1965 A. L. MENNESSON 3,185,452
CARBURETORS WORKING BY CONTINUOUS INJECTION OF FUEL INTO
THE INTAKE PIPE OF AN INTERNAL COMBUSTION ENGINE
Filed Jan. 24, 1961 4 Sheets-Sheet 1

INVENTOR
André Louis MENNESSON
BY Bailey, Stephens &
Huetig
ATTORNEY

INVENTOR
ANDRE LOUIS MENNESSON

BY
Bailey, Stephens &
Huettig
ATTORNEY

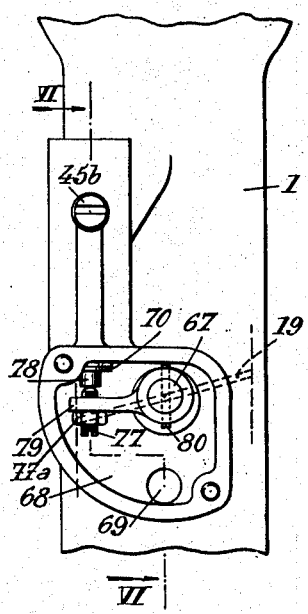

United States Patent Office 3,185,452
Patented May 25, 1965

3,185,452
CARBURETORS WORKING BY CONTINUOUS INJECTION OF FUEL INTO THE INTAKE PIPE OF AN INTERNAL COMBUSTION ENGINE
André Louis Mennesson, Neuilly-sur-Seine, France, assignor to Societe Industrielle de Brevets et d'Etudes S.I.B.E., Neuilly-sur-Seine, France, a society of France
Filed Jan. 24, 1961, Ser. No. 84,699
Claims priority, application France, Jan. 29, 1960, 817,082; Mar. 4, 1960, 820,459; July 18, 1960, 833,260
7 Claims. (Cl. 261—23)

The present invention relates to carburetors working normally by continuous injection of fuel through at least one orifice opening into the intake pipe of an internal combustion engine and comprising a main throttle member located in this pipe upstream of said orifice and a main venturi located upstream of said throttle member. In such carburetors, a fuel pressure regulating, or reducing, device varies the pressure of the fuel delivered at said fuel injection orifice in the same maner as the flow rate of air passing through the intake pipe itself varies. In the carburetors with which the present invention is concerned, an auxiliary passage, provided with an auxiliary venturi of smaller cross-section area than the main venturi and with an auxiliary throttle member, opens into the intake pipe upstream of the above mentioned injection orifice, the two throttle members being interconnected together.

The above mentioned pressure regulator is generally fed with fuel from a continuous flow pump delivering fuel under a pressure higher than that which is to be determined by said pressure regulating device.

It is known that it is difficult to obtain from the pressure regulating device an injection pressure with a high degree of precision, in accordance with the flow rate of air through the intake pipe, when this flow rate is very low. This difficulty is due to the fact that in this case, in the absence of the auxiliary passage and of its venturi, the suction existing in the main venturi and acting upon the regulating device would be extremely small as compared with the effect of the frictions which take place unavoidably during the operation.

This is why the portion of the intake pipe located upstream of the fuel injection orifice is divided into two passages, each provided with a throttle member and with a venturi, and the respective throttle members are controlled through means which open only one of the two passages for low flow rates of air and both passages for high flow rates, the suctions existing in these two venturis being used to control the fuel injection pressure. Up to now the suction existing in one of the venturis was made to act upon a first diaphragm control system and the suction existing in the other of the venturis was made to act upon a second diaphragm control system, both of these systems acting simultaneously upon the pressure regulating device. But this arrangement did not give the desired results because the combination of the two control systems made it necessary to provide between them and the pressure regulating device mechanical hinges and connections such that the frictions taking place therein prevented the obtainment of any accurate operation of the regulating device.

The chief object of the present invention is to obviate the above mentioned drawbacks.

For this purpose, according to the present invention, the fuel pressure regulating device is controlled by a single diaphragm control means or system (either simple or differential) subjected to the effect of the respective suctions in the throat portions of said venturis, acting either separately or simultaneously.

Advantageously, the respective influence of the two suctions on said single diaphragm control means is varied at the same time as the throttle members are being opened.

Preferred embodiments of the present invention will be hereinafter described with reference to the accompanying drawings, given merely by way of example and in which:

FIG. 5 is a diagrammatic side view of a carburetor made according to a third embodiment of the invention.

FIG. 6 is a diagrammatic part sectional view on the line VI—VI of FIG. 5.

Figure 1:
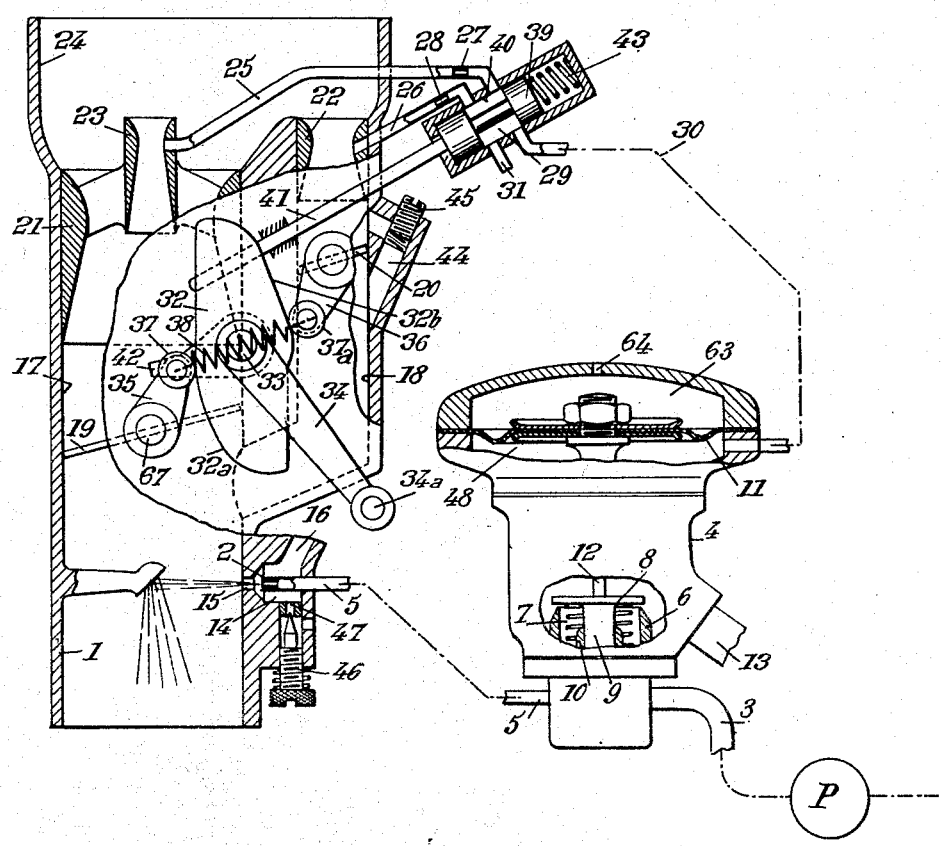
FIG. 1 is an elevational view, with parts in axial section, of a carburetor made according to a first embodiment of the invention, this carburetor being shown in the position corresponding to idling of the internal combustion engine.

The carburetor of FIG. 1 comprises an intake, or induction, pipe 1 into which opens a fuel injection orifice 2 fed with fuel under pressure, through a conduit 3, from a pump P the flow rate of which exceeds the requirements of said injection orifice and the delivery pressure of which is lowered by a pressure reducing device 4, the output of said pressure reducing device being connected with orifice 2 through a conduit 5.

Pressure reducing device 4 comprises a hollow body 6 the inside 7 of which, in communication with conduits 3 and 5, is covered at its upper end by a disc-shaped valve 8, this valve carrying a stem 9 slidable in a guide 10. Valve 8 is subjected to the opposed actions of the pressure of the fuel to be injected (acting upwardly) and of the force exerted by diaphragm control means 11 responsive to variations of the air flow rate through pipe 1, this force being transmited for instance through a rod 12. Thus, the higher the air flow rate through pipe 1, the smaller the by-pass passage existing between the upper edge of body 6 and valve 8 and consequently the higher the fuel injection pressure, the excess of fuel evacuated through said interval between body 6 and valve 8 being returned, through a conduit 13, to the tank of the fuel pump. Diaphragm 11 may be a simple diaphragm, or a differential diaphragm, that is to say diaphragm 11 may be associated with a second diaphragm of smaller area, intended for instance to prevent the suction existing on the diaphragm 11 from being transmitted to the inside of chamber 7.

Fuel injection orifice 2 opens into a chamber 14, opposite an orifice 15 which itself directly opens into pipe 1, said chamber 14 being generally kept at a pressure equal or close to atmospheric pressure in order to prevent the fuel injection orifice from being influenced by the suction existing in pipe 1 at the level of said orifice. A conduit 16 permits of venting chamber 14.

The portion of the air feed means located upstream of orifice 2 is divided into two passages, a main one 17 and a secondary one 18. Main passage 17 is provided with a throttle member 19 mounted on a spindle 67 and with a venturi 21. Secondary passage 18 is provided with a throttle member 20 and with a venturi 22. The two throttle members 19 and 20 are inter-connected together through means which practically open only passage 18 for low flow rates of air and both of the passages 17 and 18 for high flow rates of air, and the suctions existing in venturis 21 and 22 are made to act upon a single diaphragm system 11 (either simple or differential).

Preferably, as shown, passage 17 is in line with pipe 1 and substantially of the same cross-section as said pipe, whereas passage 18 is located laterally of passage 17, this passage 18 having a cross-section substantially smaller than that of passage 17. In this case, venturi 22 is given a diameter at most equal to one half of the diameter of venturi 21 inside which may be provided, as shown, a small coaxial venturi 23 in order to increase the suction created therein by the flow of air. According to the embodiment of FIGS. 1 and 2, both of these passages 17 and 18 start from a single air intake 24 provided with an air filter (not shown).

In order to subject the same diaphragm to the respective suctions existing in venturi 21 (or 23) and in venturi 22, these two venturis are both connected, through two conduits 25 and 26 respectively, provided with calibrated orifices 27 and 28, to a chamber 29 and the resultant suction created in chamber 29 is transmitted through a conduit 30 to a chamber 48 one of the walls of which is constituted by diaphragm 11. The other chamber 63 limited by diaphragm 11 is placed, through an orifice 64, in communication with the atmosphere. The resultant suction existing in chamber 29 may be reduced by providing said chamber with a bleed orifice 31 communicating with the outside.

The means for controlling throttle members 19 and 20 comprise a cam 32 fixed on the same rotating spindle 33 as a lever 34 the end 34a of which is connected to the usual throttle control means operated by the driver. This cam comprises two active portions 32a and 32b against which are applied, through the intermediate of rollers 37 and 37a, the ends of levers 35 and 36 respectively mounted on throttle members 19 and 20. In order to avoid any lost motion, a spring 38 connecting the axes of rollers 37 and 37a together keeps these rollers constantly applied against surfaces 32a and 32b. These cam portions should have outlines such that, when the cam starts from idling position (FIG. 1), it first operates, through its active portion 32b, only lever 36 and consequently throttle member 20, then, through its active portion 32a, lever 35 and consequently throttle member 19, until said cam comes into the full load position illustrated by FIG. 2.

Advantageously, as shown, the means for operating throttle members 19 and 20 are arranged in such manner as to vary, simultaneously with the opening of these throttle members, the respective influence open diaphragm 11 of the suctions existing in venturi 21 (or 23) and in venturi 22. For this purpose, said throttle members are operatively connected with valve means capable of cutting off the connection between venturi 22 and diaphragm 11 when throttle member 19 begins to open or at least reaches a predetermined degree of opening.

Figure 2:
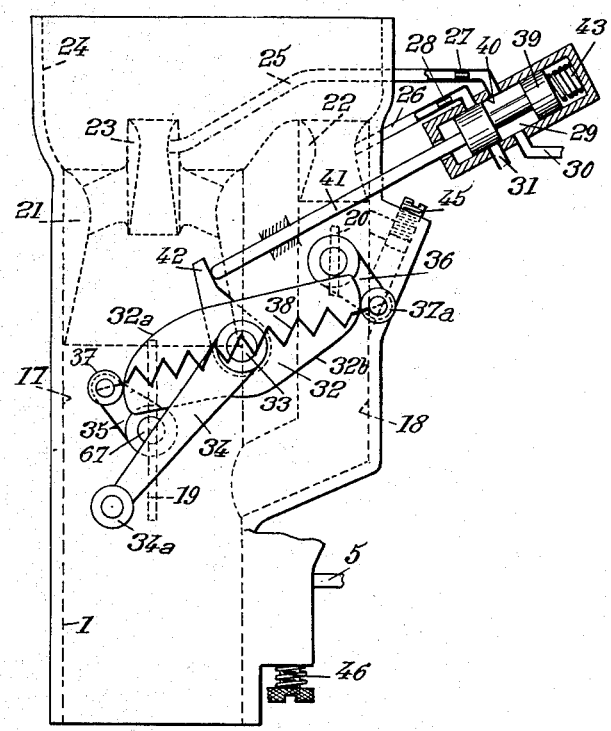
FIG. 2 is a view, similar to FIG. 1, of a portion of this carburetor in the position corresponding to the engine working under full load.

As shown by FIGS. 1 and 2, such valve means comprises a slide valve 39 slidable in a cylindrical housing 40 and the two cylindrical portions of which limit, in said housing 40, a space corresponding to chamber 29. This slide valve 39 is carried by a rod 41 the end of which cooperates with a lever 42 rigid with cam 32. A spring 43 urges slide valve 39 toward the position illustrated by FIG. 1 where the three conduits 25, 26 and 30 and port 31 communicate freely with chamber 29. The orifices through which conduit 26 and port 31 open into chamber 29 are located in positions such that they are closed by one of the cylindrical portions of slide valve 39 when said slide valve is moved by contact of rod 41 with lever 42, against the action of spring 43.

The carburetor further comprises a channel 44 capable of connecting together, in any known manner, the portions of the passage 18 located respectively upstream and downstream of throttle member 20 so as to permit the passage of air for the idling running of the engine. A screw 45 permits of adjusting the amount of this air without modifying the position of throttle member 20. As for the richness of the fuel and air mixture in idling conditions, it may be determined by means of a screw 46 controlling an orifice 47 for venting chamber 14.

The above described carburetor works as follows. Under conditions approximating idling (FIG. 1), cam 32 gradually opens first only throttle member 20, the combustion air passing exclusively through passage 18 as soon as throttle member 20 is slightly opened. In view of the fact that all this air flows through venturi 22 which is of small cross-section area, the suction existing in this venturi and which is transmitted to chamber 48 under diaphragm 11 through conduit 26, chamber 29 and conduit 30, varies in an accurate manner in accordance with the flow rate of this air stream, which also accurately determines the fuel injection pressure.

Then cam 32 produces the gradual opening of throttle member 19, so that chamber 29 and consequently the chamber 48 under diaphragm 11 are more and more subjected to the suction existing in venturi 21 (or 23). Finally, when the parts are in the position corresponding to full load running (FIG. 2), both of the throttle members 19 and 20 are fully opened, and lever 42 moves slide valve 39 against the action of spring 43 so that this valve closes conduit 26 and port 31.

Diaphragm 11 is then subjected exclusively to the suction existing in venturi 21 (or 23), and arrangement which has been found to be advantageous for practical purposes.

Instead of simultaneously closing conduit 26 and port 31, slide valve 39 might close, at least partly, in a different order, the conduits which open into chamber 29. Furthermore, instead of a slide valve 39 actuated by a lever 42 rigid with the spindle 33 of the cam, use might be made of a rotary distributing valve actuated either in the same manner as slide valve 39, or by elements rigid either with the spindle 67 of throttle member 19 or with that of throttle member 20. Finally, instead of having the throttle members actuated by a cam 32 the axis 33 of which is distinct from each of the axes of throttle members 19 and 20, it would be possible to act directly upon one of these axes through lever 34 and to interpose a suitable mechanical connection between the two throttle members 19 and 20.

It has been found that, when the two passages 17 and 18 are fed with air directly from a common air intake such as 24, that is to say when auxiliary passage 18 starts from a portion of the intake pipe located upstream of the throat of the main venturi 21 (FIG. 1), it happens in some cases, more especially for positions of the throttle members 19 and 20 close to their full opening positions, that the suction existing in auxiliary venturi 22 becomes less important than the suction existing in the main venturi 21. This is due to the relatively important obstruction produced in auxiliary passage 18 by its throttle member 20. It follows that, for high powers supplied by the engine, the suction existing in venturi 22 is smaller than the suction existing in venturi 21, even if this last mentioned venturi is not a double venturi as shown by FIG. 1. In these conditions, when the suction existing in the main venturi 21 is itself rather small, it happens that conduit 26, which is intended to transmit the suction existing at the throat of auxiliary venturi 22, acts no longer in such manner as to transmit said suction to chamber 48, but to create a bleed which reduces the value of the suction acting upon diaphragm 11, this suction then becoming lower than that existing in the throat of the main venturi 21.

Figures 3, 4:
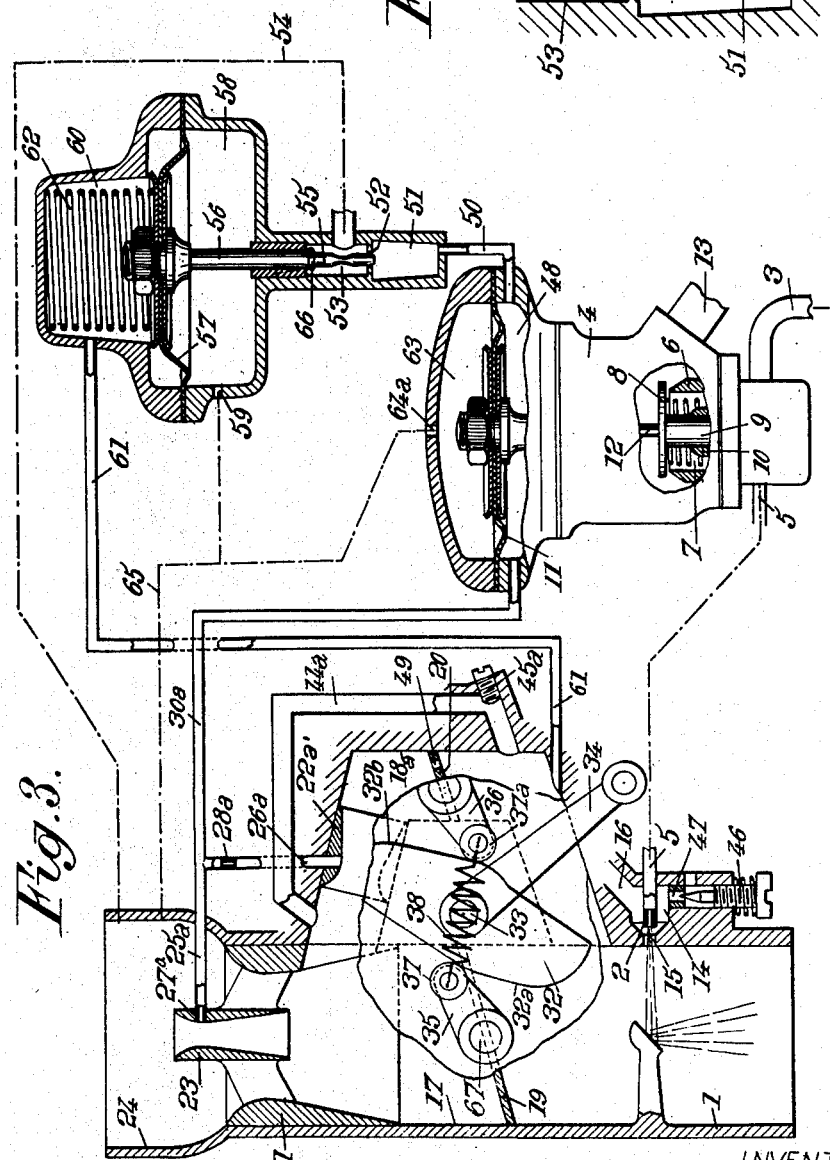
FIG. 3 shows, partly in elevation and partly in axial section, a carburetor made according to a second embodiment of the invention, in the position corresponding to idling.
FIG. 4 shows, on an enlarged scale, a detail of FIG. 3 in the position corresponding to the engine working under full load.

In order to obviate this drawback, according to the embodiment of FIGS. 3 and 4, the auxiliary passage 18a starts from a portion of the air feed means which is located, not upstream of the main venturi 21, as in the case of FIGS. 1 and 2, but downstream of the throat of this venturi.

In this way, the suction existing in conduit 26a is always at least equal (in absolute value) to the suction existing downstream of the throat of venturi 21, which prevents conduit 26a from acting as a bleed capable of reducing the suction acting upon diaphragm 11, even when the throttle members 19 and 20 are close to their full opening position.

According to the construction of FIGS. 1 and 2, conduit 44 starts from a portion of the auxiliary passage located between auxiliary passage located between auxiliary venturi 22 and throttle member 20. This arrangement has the drawback that adjustment of the air flow rate under idling conditions by means of screw 45 modifies the suction existing in auxiliary venturi 22, which complicates the general conditions of adjustment.

In order to obviate this drawback, according to the construction of FIGS. 3 and 4, there is provided in the auxiliary throttle member 20 an orifice 49 which, in combination with a suitably chosen diameter of auxiliary venturi 22a, determines, under idling conditions, the suction necessary to ensure a good variation of the richness of the air and fuel mixture as the throttle members 19 and 20 are being opened. Furthermore, conduit 44a starts from a region located upstream of auxiliary venturi 22a and preferably, as shown by FIG. 3, downstream of the main venturi 21. In some cases, and more particularly when venturi 21 is relatively small for the engine on which the carburetor is fitted, this conduit 44a may start directly from the air intake 24.

In this manner, if the idling speed is too low or too high, it is possible to adjust this speed by acting upon screw 45a without simultaneously modifying the flow rate of the air passing through auxiliary venturi 22a. As a matter of fact it is known that, under conditions close to idling, it is possible to change this speed without modifying the suction that exists in the intake pipe. As this suction does not vary, the suction existing in auxiliary venturi 22a also does not change.

In order to vary the influence upon diaphragm 11 of the suctions existing in venturis 21 and 22, in accordance with the position of the main and auxiliary throttle members, the construction of FIGS. 1 and 2 makes use of a mechanical system operating slide valve 39. For the same purpose, in the construction of FIGS. 3 and 4, the factor representing the position of throttle members 19 and 20 is the suction existing in the air feed means downstream of these two members.

For this purpose, conduits 25a, 26a and 30a being connected directly together, the chamber 48 located under diaphragm 11 is connected, not only with conduit 30a, but also with a conduit 50 leading to a chamber 51 adapted to be placed in communication with the atmosphere through an orifice 52 of variable cross-section area.

Orifice 52 connects chamber 51 with a chamber 53 which communicates with the atmosphere, either directly or, as shown by FIG. 3, through the intermediate of a conduit 54 extending between chamber 53 and the main air intake 24 of the carburetor.

In calibrated orifice 52 there is provided a needle 55 of suitable profile, carried by a rod 56 fixed to a deformable diaphragm 57. Chamber 58, located under diaphragm 57, communicates through an orifice 59 with the external atmosphere, whereas the upper chamber 60 communicates, through a conduit 61, with the air feed means of the carburetor downstream of throttle members 19 and 20. This chamber 60 further contains a spring 62 which constantly urges diaphragm 57, and consequently needle 55, downwardly against the action of the suction existing in chamber 60. It will be seen that the movement of diaphragm 57 and rod 56 and needle 55 has for its effect to vary in a suitable manner the cross-section area of the annular passage existing between the periphery of orifice 52 and needle 55, that is to say the passage between chamber 48 and the atmosphere, which passage, for given sections of calibrated orifices 27a and 28a, determines, for every value of the suction in the air feed means, the suction acting upon diaphragm 11, which controls the fuel injection pressure.

Finally, the chamber 63 of pressure regulating device 4 located above diaphragm 11 is placed, through orifice 64a, in communication with the atmosphere or, preferably as shown, with the main air intake 24 of the carburetor. The same channel 65 may be used to connect chambers 58 and 63 with the air intake 24.

Calibrated orifice 52 may be fully closed for the lowermost position of needle 55 by providing on the upper portion of said needle 55 a joint consisting of a rubber ring 66 adapted to bear against the edge of orifice 52 (as shown by FIG. 4), so that in this case diaphragm 11 is subjected to the whole of the suctions transmitted through orifices 27a and 28a.

In this manner, under idling conditions and when throttle members 19 and 20 are in limited opening positions, which keeps an important suction in the intake pipe, diaphragm 57 is in an upper position and needle 55 permits a communication with the outside through orifice 52, which reduces the suction existing in chamber 48. The shape of the needle is chosen in such manner that this resultant suction exerts on the fuel injection orifice 2 the pressure corresponding to the flow rate of fuel to be absorbed by the engine.

When throttle members 19 and 20 are in full opening positions, the suction in the air feed means becomes small and at this time spring 62 has a prepondering action and pushes diaphragm 57 and rod 56, together with needle 55, in the downward direction (see FIG. 4) until, possibly, orifice 52 is closed by rubber ring 66. Therefore the same result is obtained as in the construction of FIGS. 1 and 2, to wit that, in the full opening positions of throttle members 19 and 20, the suctions existing in venturis 21 and 22a are transmitted integrally to diaphragm 11, whereas, in the other positions of throttle members 19 and 20, a reduced suction is transmitted due to the opening of orifice 52.

FIGS. 5 and 6 show a modification of the embodiment of FIGS. 3 and 4 concerning the structure of the auxiliary throttle valve mounted in the auxiliary air passage.

In the construction of FIGS. 5 and 6, as in that of FIGS. 3 and 4, auxiliary passage 18b starts from a region of the air feed means located downstream of the throat of the main venturi 21 and contains an auxiliary venturi 22a. This passage 18b opens into a chamber 68 which is in communication with the main passage 17, downstream of the main throttling member 19, through an orifice 69.

The flow through passage 18b is adjusted in this case by a valve having a suitably shaped head and advantageously located, as shown, between venturi 22b and chamber 68, this valve being actuated by the spindle 67 of the main throttle member 19, which spindle is actuated directly by the throttle control means.

This valve advantageously comprises a disc or plate 70 adapted to cooperate with a seat 71 so as possibly to achieve complete closing, as it will be explained hereinafter. Above (upstream of) this disc, there is provided a head 72 in the form of a body of revolution, having a shape such as will be hereinafter more fully described, this head being provided, at the top thereof, with a rod 73 which carries, at its upper end, a transverse pin 73a.

This valve 70, 72 cooperates with a valve body 74 fixed in passage 18b and adapted to permit the flow of air when the valve is open, owing to orifices 75.

A spring 76 constantly urges valve 70, 72 toward the opened position, and this valve may be kept in the closed position by an adjustable screw 77 acting either directly upon disc 70, or preferably, upon a projection 78 carried by this disc.

Adjustable screw 77 is carried by a lever 79 rigid with the spindle 67 which drives the main throttle member 19. These parts are assembled together by a pin 80. Chamber 68 is closed by a cover 81.

On the other hand, the carburetor includes various accessory conduits and in particular a conduit 49a which permanently connects the space downstream of auxiliary venturi 22b with the air feed means of the engine downstream of throttle member 19 and a conduit 44b adjustable by a screw 45b which connects the space upstream of auxiliary venturi 22b with said air feed means downstream of the main throttle member 19.

The operation of the throttle valve device of FIGS. 5 and 6 is as follows (the general operation of the carburetor being the same as in the embodiment of FIGS. 3 and 4). When the main throttle member 19 is gradually opened, lever 79 moves in the anti-clockwise direction (FIG. 5), thus gradually releasing valve 70, 72. This valve has a tendency to open both under the action of spring 76 and under the influence of the suction existing in the intake pipe and in chamber 68.

A very accurate adjustment of the law of opening of this valve, which determines the amount of air flowing through the auxiliary venturi 22b and consequently the suction acting upon the pressure regulating device, may be obtained by giving the generatrix which determines the shape of the head 72 of said valve a suitable shape. As a matter of fact, the amount of air flowing through venturi 22b for every position of opening of throttle member 19 is determined by the annular cross-section area between said head 72 and the bore in which said head is moving. It will be understood that it is easy, for a given type of engine, to trace once and for all the generatrix in question, which may be subsequently reproduced.

The adjustment screw 77, fixed by a nut 77a, permits of closing valve 70, 72 for a given opening of the main throttle member 19, which corresponds to the position normally used under idling conditions.

If some defects exist, either in a new apparatus due to the tolerances for machining the parts thereof, or due to wear and tear or for any other reason, it is easy, by acting upon adjusting screw 77, to restore the desired correspondence between the position of throttle member 19 and the position of valve 70, 72.

Conduit 49a serves, when throttle member 19 is in the full closing position, to keep a slight stream of air flowing through venturi 22b, so as to produce a slight suction in conduits 25b and 26b. It is in fact necessary that, immediately upon opening of throttle member 19, and consequently of valve 70, 72, there should be an immediate increase of the suction in the pressure regulating device. It is therefore necessary to obtain, even under idling conditions, a suction having for its effect to balance the action of the weights and of the frictions and resistances of all kinds which exist in said pressure regulating device.

Adjustment of idling is obtained by means of screw 45b which adjusts the amount of air fed to the engine, when throttle member 19 and valve 70, 72 are closed and, as above indicated with reference to FIGS. 1 and 2, this air is collected upstream of the auxiliary venturi 22b so that a flow rate change obtained by acting upon screw 45b does not change the suction existing in conduits 25b and 26b due to the existence of conduit 49a provided for this purpose.

In a general manner, while the above description discloses what is deemed to be a practical and efficient embodiment of the invention, it should be well understood that there might be changes made in the arrangement, disposition and form of the parts without departing from the principle of the invention as comprehended within the scope of the accompanying claims.

What I claim is:

1. A carburetor which comprises, in combination, an intake pipe provided with a fuel injection orifice, air feed means forming two air passages opening both into said pipe upstream of said orifice, a main one and an auxiliary one, main throttle means in said main passage to control the flow of air therethrough, auxiliary throttle means in said auxiliary passage to control the flow of air therethrough, means for operativley connecting said respective throttle means with each other, a main venturi mounted in said air feed means upstream of said main throttle means, an auxiliary venturi mounted in said auxiliary passage, said auxiliary venturi being of smaller cross-sectional area than said main venturi, a fuel pressure reducing device comprising an inlet conduit, an output conduit, a fuel flow control valve interposed between said inlet and output conduits for varying the fuel pressure in said output conduit and a single diaphragm means operatively connected with said control valve for operating it in accordance with variations of a suction applied to said diaphragm means, means for feeding fuel under pressure to said inlet conduit, means for connecting said output conduit with said fuel injection orifice, conduit means between, on the one hand, the throats of said venturis, respectively, and, on the other hand, said diaphragm means, for transmitting to said diaphragm means respective suctions from said venturis, and means for varying the respective values of said last mentioned suctions in accordance with the position of both of said throttle means.

2. A carburetor which comprises, in combination, an intake pipe provided with a fuel injection orifice, air feed means forming two air passages opening both into said pipe upstream of said orifice, a main one and an auxiliary one, main throttle means in said main passage to control the flow of air therethrough, auxiliary throttle means in said auxiliary passage to control the flow of air therethrough, means for operatively connecting said respective throttle means with each other, a main venturi mounted in said air feed means upstream of said main throttle means, an auxiliary venturi mounted in said auxiliary passage, said auxiliary venturi being of smaller cross-section area than said main venturi, a fuel pressure reducing device comprising an inlet conduit, an output conduit, a fuel flow control valve interposed between said inlet and output conduits for varying the fuel pressure in said output conduit and a single diaphragm means operatively connected with said control valve for operating it in accordance with variations of a suction applied to said diaphragm means, means for feeding fuel under pressure to said inlet conduit, means for connecting said output conduit with said fuel injection orifice, a chamber, conduit means between, on the one hand, the throats of said venturis, respectively, and, on the other hand, said chamber, means for transmitting the suction produced in said chamber to said diaphragm means, and means operatively connected with both of said throttle means for cutting off the connection of said last mentioned conduit means which extends between the throat of said auxiliary venturi and said chamber when said main throttle means has reached a given degree of opening.

3. A carburetor which comprises, in combination, an intake pipe provided with a fuel injection orifice, air feed means forming two air passages opening both into said pipe upstream of said orifice, a main one and an auxiliary one, main throttle means in said main passage to control the flow of air therethrough, auxiliary throttle means in said auxiliary passage to control the flow of air therethrough, means for operatively connecting said respective throttle means with each other, a main venturi mounted in said air feed means upstream of said main throttle means, an auxiliary venturi mounted in said auxiliary passage, said auxiliary venturi being of smaller cross-section area than said main venturi, a fuel pressure reducing device comprising an inlet conduit, an output conduit, a fuel flow control valve interposed between said inlet and output conduits for varying the fuel pressure in said output conduit and a single diaphragm means operatively connected with said control valve for operating it in accordance with variations of a suction applied to said diaphragm means, means for feeding fuel under pressure to said inlet conduit, means for connecting said output conduit with said fuel injection orifice, conduit means between, on the one hand, the throats of said venturis, respectively, and, on the other hand, said diaphragm means, for transmitting to said diaphragm means respective suctions from said venturis, and means responsive to variations of the suction in said air feed means downstream of both of said throttle means for varying the action of the suctions in said venturis on said diaphragm means.

4. A carburetor according to claim 3 wherein said auxiliary throttle means comprises a valve seat fixed with respect to said auxiliary passage transversely thereto and a valve member slidable in said auxiliary passage transversely to said seat, said valve member being of non-uniform cross-section and defining with the valve seat an annular area for the passage of air between said valve member and said valve seat which varies with the position of said valve member with respect to said valve seat, the means for operatively connecting said respective throttle means with respect to each other consisting of means for moving said valve member with respect to said valve seat in the direction that increases said annular area of passage in response to the opening of said main throttle means.

5. A carburetor according to claim 3 wherein said auxiliary passage starts from a portion of said air feed means located downstream of the throat of the main venturi.

6. A carburetor which comprises, in combination, an intake pipe provided with a fuel injection orifice, air feed means forming two air passages opening in parallel into said pipe upstream of said orifice, a main one and an auxiliary one, main throttle means mounted in said main passage to control the flow of air therethrough, auxiliary throttle means in said auxiliary passage to control the flow of air therethrough, means for operatively connecting said respective throttle means with each other, a main venturi mounted in said air feed means upstream of said main throttle means, an auxiliary venturi mounted in said auxiliary passage, said auxiliary venturi being of smaller cross-section area than said main venturi, a fuel pressure reducing device having an inlet conduit and an output conduit, means for feeding fuel under pressure to said inlet conduit, said output conduit being connected with said fuel injection orifice, said fuel pressure reducing device comprising a fuel flow control valve interposed between said inlet and output conduits for varying the fuel pressure in said output conduit and a single diaphragm means operatively connected with said control valve for operating it in accordance with variations of a suction applied to said diaphragm means, means for transmitting to said diaphragm means the suctions in said venturis respectively, means for the circulation of air under idling conditions comprising a conduit arranged in parallel with said auxiliary passage so as to by-pass the throttle means thereof, means to adjust the cross-section area of the last mentioned conduit, said auxiliary throttle means being provided with a permanently open passage of small cross-section extending therethrough, said idling conduit starting from a region located upstream of the auxiliary venturi.

7. A carburetor which comprises, in combination, an intake pipe provided with a fuel injection orifice, means forming two air passages opening in parallel into said pipe upstream of said orifice, a main one and an auxiliary one, main throttle means mounted in said main passage to control the flow of air therethrough, auxiliary throttle means in said auxiliary passage to control the flow of air therethrough, means for operatively connecting said respective throttle means with each other, a main venturi mounted in said intake pipe upstream of said main throttle means, an auxiliary venturi mounted in said auxiliary passage, said auxiliary venturi being of smaller cross-section area than said main venturi, a fuel pressure reducing device having an inlet conduit and an output conduit, means for feeding fuel under pressure to said inlet conduit, said output conduit being connected with said fuel injection orifice, said fuel pressure reducing device comprising a fuel flow control valve interposed between said inlet and outlet conduits for varying the fuel pressure in said output conduit and a single diaphragm means operatively connected with said control valve for operating it in accordance with variations of a suction applied to said diaphragm means, and means for transmitting to said diaphragm means the suctions in said venturis respectively, said auxiliary throttle means comprising a fixed seat in said auxiliary passage and a movable valve having a suitably shaped head adapted to cooperate with said seat, spring means for urging said last mentioned valve in the opening direction, a lever rigid with said main throttle means and an abutment screw carried by said lever adapted to bear on said last mentioned valve to move it in the closing direction in response to the moving of said main throttle means toward the closed position thereof.

References Cited by the Examiner
UNITED STATES PATENTS

| | | | |
|---|---|---|---|
| 2,609,806 | 9/52 | Winkler | 261—39.2 |
| 2,871,002 | 1/59 | Gall | 261—23.1 |
| 2,874,944 | 2/59 | Dolza | 261—36.1 |
| 2,893,711 | 7/59 | McDuffie | 261—23.1 |

HARRY B. THORNTON, *Primary Examiner.*

HERBERT L. MARTIN, *Examiner.*